United States Patent [19]
Zschoche

[11] Patent Number: 5,261,778
[45] Date of Patent: Nov. 16, 1993

[54] UNIVERSAL AIRCRAFT TUG ASSEMBLY

[75] Inventor: Robert A. Zschoche, Astoria, Oreg.

[73] Assignee: Eric W. Paulson, Astoria, Oreg.

[21] Appl. No.: 916,025

[22] Filed: Jul. 17, 1992

Related U.S. Application Data

[62] Division of Ser. No. 621,070, Nov. 30, 1990, Pat. No. 5,151,003.

[51] Int. Cl.$^5$ ............................................. B60B 29/00
[52] U.S. Cl. .................................. 414/430; 414/426; 414/494; 414/559; 280/79.4; 180/904; 244/50
[58] Field of Search ............... 414/426, 427, 428, 429, 414/430, 500, 494, 559, 538, 570; 244/50; 280/402, 79.4; 180/904; 254/362

[56] References Cited

U.S. PATENT DOCUMENTS

| | | | |
|---|---|---|---|
| 1,819,625 | 8/1931 | Schroeder | 414/494 |
| 2,240,723 | 5/1941 | Stoehr | 414/428 X |
| 3,586,187 | 6/1971 | Wright | 414/428 |
| 3,598,259 | 8/1971 | Wright | 414/428 |
| 4,130,210 | 12/1978 | Purviance | 414/430 X |
| 4,376,611 | 3/1983 | Koop | 414/559 X |
| 4,950,121 | 8/1990 | Meyer et al. | 414/429 X |

OTHER PUBLICATIONS

Appendix A showing a prototype aircraft tug assembly having a nosewheel scoop (photograph).
Appendix B showing an "Airporter" aircraft tub assembly having a nosewheel scoop and the various scoop adapters (flier and drawings).
Appendix C shows an AIRTUG ® device manufactured by Airtek, Inc. (flier).
Appendix D shows The Air Deere device manufactured by Moebius, Inc. (flier).

Primary Examiner—Frank E. Werner
Assistant Examiner—James T. Eller, Jr.
Attorney, Agent, or Firm—Klarquist Sparkman Campbell Leigh & Whinston

[57] ABSTRACT

An aircraft tug assembly is provided for moving an aircraft on the ground. The tug assembly includes a self-propelled chassis responsive to operator control. A cradle assembly is pivotally attached to a front portion of the chassis. The cradle assembly has an adjustable nosewheel receiving apparatus comprising two lateral arms adjustably engaged with a rear gate to define a nosewheel receiving corral therebetween, with the corral sizable to accommodate varying sized aircraft nosewheels. The chassis has a winch for pulling an aircraft nosewheel onto the cradle assembly and into the corral. An optional front gate may be used to enclose the nosewheel within the corral. Hydraulic actuators lift the cradle assembly with the nosewheel thereon so the tug assembly may move the aircraft without starting the aircraft engine.

5 Claims, 6 Drawing Sheets

UNIVERSAL AIRCRAFT TUG ASSEMBLY

This is a division of U.S. patent application Ser. No. 07/621,070, filed Nov. 30, 1990, now U.S. Pat. No. 5,151,003.

BACKGROUND OF THE INVENTION

The present invention relates generally to aircraft tug assemblies, and more particularly to an improved universal aircraft nosewheel cradle and an improved tug assembly for moving an aircraft on the ground.

Various devices have been used to move airplanes on the ground without starting the aircraft engine. One known system uses a towing vehicle having a tow bar which attaches to the axle of the aircraft nosewheel. This tow bar system may disadvantageously require a separate tow bar or tow bar adapter for each different type of nosewheel axle assembly. Furthermore, a new tow bar or adapter is required for each new aircraft design. Matching the correct tow bar or adapter to the correct aircraft is often a time consuming process, and valuable airport storage space is required to store all the various towbars.

Additionally, the tow bar system requires ample room within which to maneuver the aircraft. This is due to the overall length of the towing vehicle and tow bar, and due to the awkward operation of the tow bar system, particularly when backing the aircraft into place. These drawbacks of the tow bar system are particularly disadvantageous for an airport handling a variety of aircraft. For example, an airport sponsoring an airshow must move a variety of aircraft, including many prototype aircraft, all of which must be positioned by the towing vehicle relatively close together for public display.

Another known aircraft tug assembly includes a self-propelled chassis having a nosewheel scoop mounted to the front of the chassis by a 3-point hitch. A manually operated winch is mounted to the chassis to pull the aircraft nosewheel onto the nosewheel scoop. This nosewheel scoop requires a variety of different adapters to receive the various nosewheel configurations. For example, some aircraft have a single nosewheel, while others have a dual nosewheel, that is two tires mounted side by side. Additionally, some nosewheels include wheel skirts or pants surrounding the upper portion of the wheel to enhance the aerodynamic characteristics of the aircraft. While this nosewheel scoop tug assembly has improved maneuverability over the tow bar design above, it still suffers the drawbacks of requiring a multitude of different adapters to accommodate the various nosewheel designs.

Thus a need exists for an improved universal aircraft nosewheel cradle and tug assembly, which is directed toward overcoming and not susceptible to, the above limitations and disadvantages.

SUMMARY OF THE INVENTION

It is an overall object of the present invention to provide an improved aircraft tug assembly for moving aircraft on the ground.

A further object of the present invention is to provide an improved universal aircraft nosewheel cradle for use with an aircraft tug.

Another object of the present invention is to provide an improved universal aircraft nosewheel cradle and tug assembly which are capable of accommodating a variety of nosewheel designs, without requiring a variety of cumbersome adapters.

An additional object of the present invention is to provide an improved universal aircraft nosewheel cradle and tug assembly which are easy to operate and which save labor time.

Still another object of the present invention is to provide a safer universal aircraft nosewheel cradle and a safer tug assembly A further object of the present invention is to provide an improved universal aircraft nosewheel cradle and tug assembly which does not damage the aircraft or the airport facilities, such as the airport hangars.

According to one aspect of the present invention, an aircraft nosewheel cradle assembly for an aircraft tug includes a cradle member attachable to the aircraft tug. The cradle member has an upper surface with a front edge. A transverse axis extends substantially parallel with the upper surface and the front edge of the cradle member, and a longitudinal axis extends perpendicular to the transverse axis and substantially parallel with the upper surface. The cradle assembly also includes a pair of lateral substantially mutually parallel arms adjustably mounted to the upper surface of the cradle member substantially parallel with the longitudinal axis. Each lateral arm has plural rear gate receiving means. The cradle assembly also has a rear gate adjustably mounted to one of the plural rear gate receiving means on each of the lateral arms, such that the rear gate is substantially parallel with the transverse axis. In this manner, the rear gate and lateral arms cooperate to define an aircraft nosewheel receiving corral on the upper surface of the cradle member, with the corral size being adjustable to accommodate varying sized aircraft nosewheels.

According to a further aspect of the present invention, an aircraft tug is provided for moving an aircraft having a nosewheel. The tug includes a self-propelled chassis responsive to operator controlled means. The chassis has a front portion, and a nosewheel cradle assembly as described above is attached to the chassis front portion. The tug also includes winch means secured to the chassis for pulling the aircraft nosewheel onto the cradle member upper surface.

According to a further aspect of the present invention, an aircraft tug is provided for moving an aircraft having a nosewheel, with the tug including a self-propelled chassis as described above. A cradle assembly is pivotally attached to the chassis front portion, with the cradle assembly having adjustable nosewheel receiving means for accommodating varying sized aircraft nosewheels. The tug also has electrically powered winch means secured to the chassis for pulling the aircraft nosewheel onto the cradle assembly. The tug has automatic winch shut-off means responsive to a transport position of an aircraft nosewheel within the cradle assembly. The shut-off means are provided for shutting off of the winch means when the aircraft nosewheel is in the transport position.

The present invention relates to the above features and objects individually as well as collectively. These and other objects, features and advantages of the present invention will become apparent to those skilled in the art from the following description and drawings.

DETAILED DESCRIPTION OF THE PREFERRED EMBODIMENTS

Figure 1:
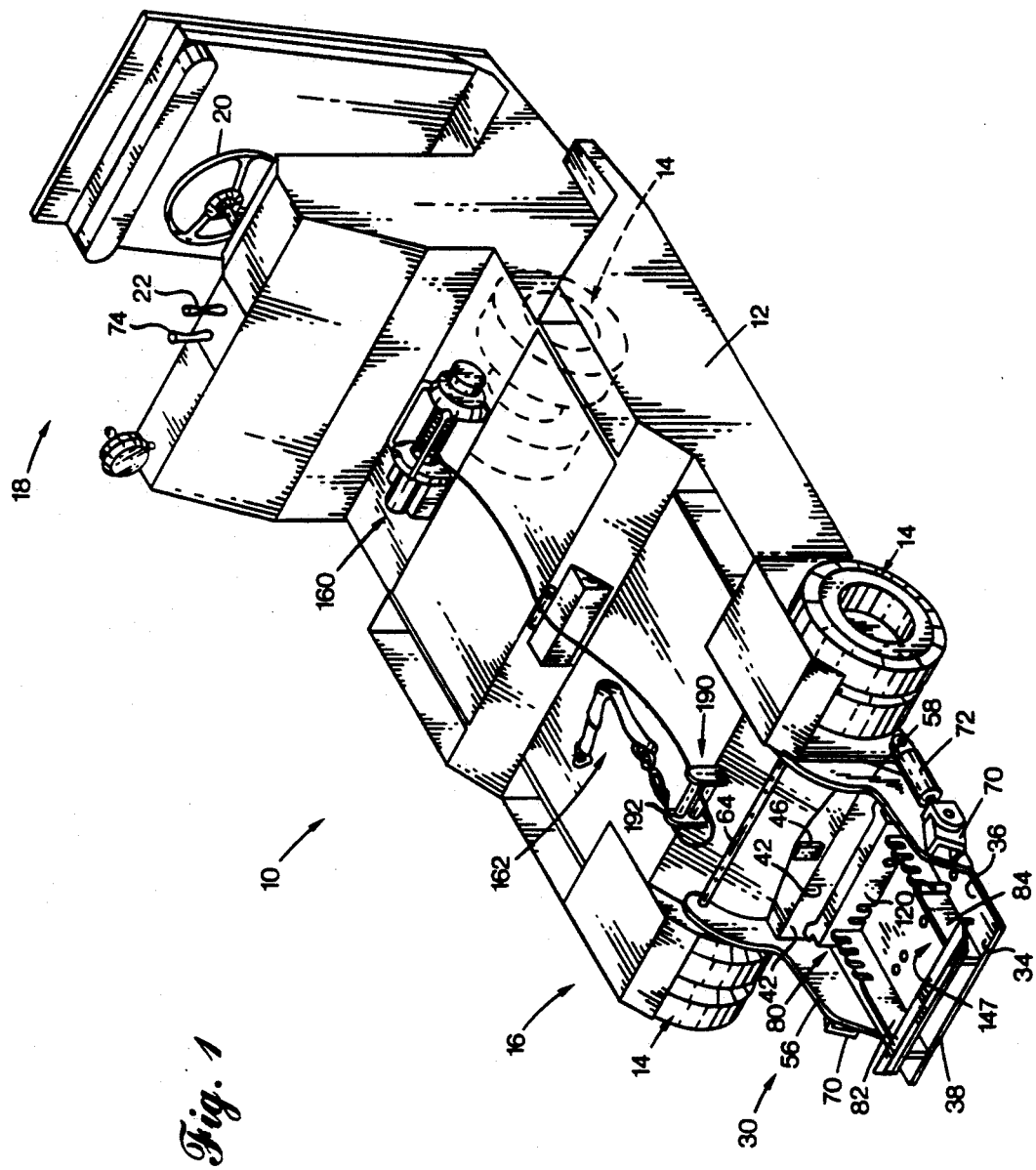
FIG. 1 is a perspective view of one form of a tug assembly of the present invention.

FIG. 1 illustrates a first embodiment of an aircraft tug assembly or tug 10 constructed in accordance with the present invention for moving an aircraft on the ground without requiring starting of the aircraft engines. The tug 10 has a chassis 12 supported by conventional axle, wheel and tire assemblies 14. The chassis 12 has a front portion 16 and a rear cab portion 18 from where an operator may control the tug 10. In the preferred embodiment, the tug 10 is an electrical vehicle powered in a conventional manner by on-board batteries (not shown). The rear cab portion 18 includes a steering wheel 20 and a first lever 74 for controlling the forward and rearward motion of the tug 10 and the speed at which the forward and rearward motion occurs.

Figure 2:
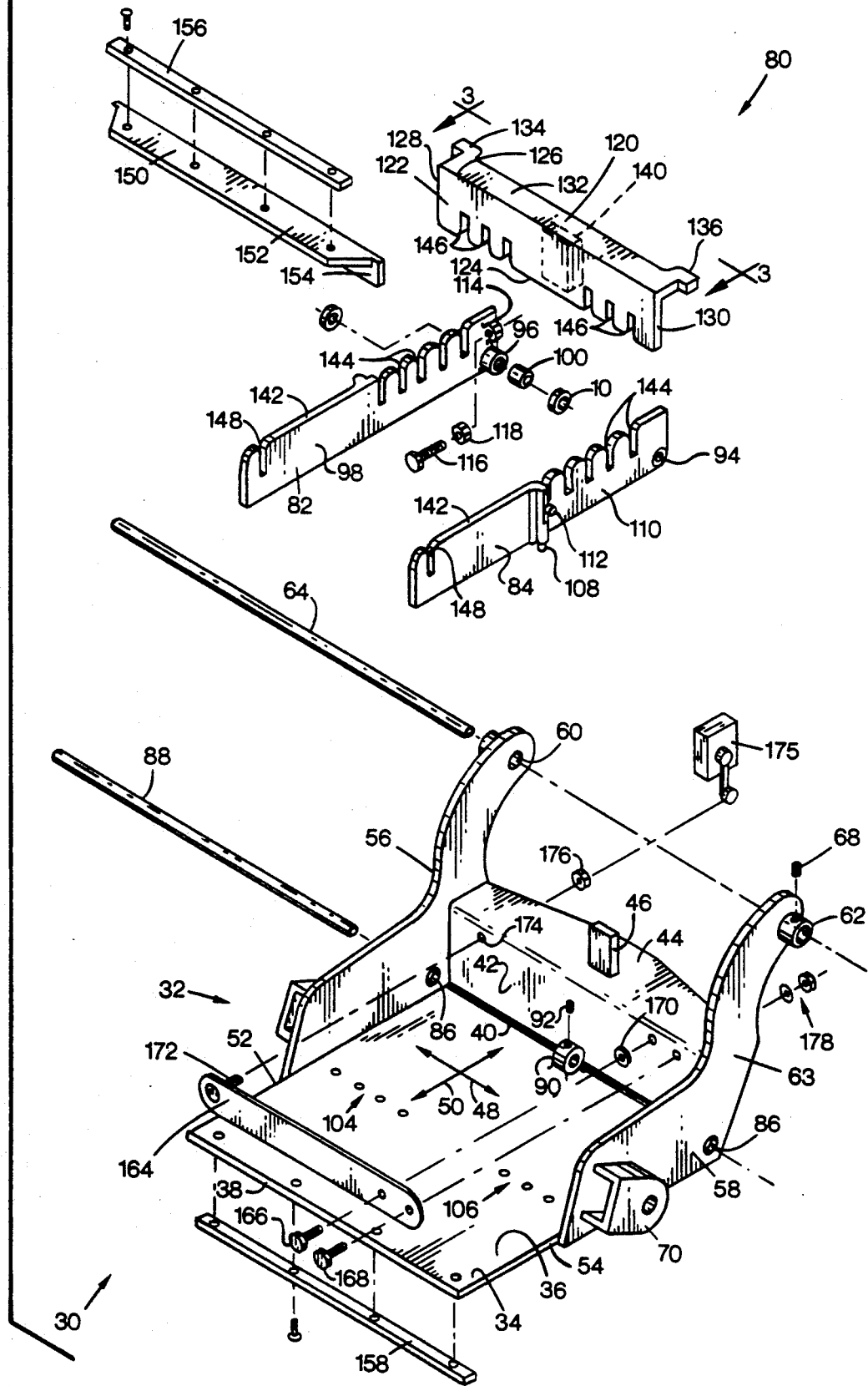
FIG. 2 is an enlarged exploded perspective view of the aircraft nosewheel cradle assembly of FIG. 1.

A universal aircraft nosewheel cradle assembly 30 is attached to the front portion 16 of tug 10. Referring also to FIG. 2, the cradle assembly 30 includes a cradle member 32 having a lower horizontal wall 34 with an upper surface 36, and opposing front and rear edges 38 and 40, respectively. An upright rear wall 42 extends upwardly from rear edge 40 and terminates in a rearwardly extending substantially horizontal stub shaft supporting wall 44. A stub shaft 46 projects upwardly through the wall 44 and extends downwardly adjacent a rear surface of wall 42.

The cradle member 32 has a transverse axis 48 which is substantially parallel with the upper surface 36, and the front and rear edges 38, 40 as well as rear wall 42. A longitudinal axis 50 is perpendicular to the transverse axis 48 and substantially parallel with the upper surface 36. The lower horizontal wall 34 has opposing side edges 52, 54 which, in the illustrated embodiment, are substantially parallel to the longitudinal axis 50. A pair of upright sidewalls 56 and 58 extend upwardly from the side edges 52 and 54, respectively and are also joined to opposing side edges of walls 42 and 44.

Each sidewall 56, 58 has pivot attachment means, comprising pivot hole 60 extending therethrough and a collar 62 concentric with hole 60 and extending outwardly from the sidewall outboard surface, such as outboard surface 63 of sidewall 58. A pivot rod 64 extends through the pivot hole 60 and collar 62 on each sidewall 56, 58 to pivotally attach the cradle assembly 30 to the front portion 16 of the tug chassis 12 (see FIG. 1). The chassis 12 includes conventional pivot rod receiving means (not shown) for receiving rod 64. The pivot rod 64 is held in axial alignment by two set screws (not shown) on the front portion 16 of the chassis.

To pivot the cradle assembly 30 about the pivot rod 64, each sidewall 56, 58 has ram attachment means, such as a ram attachment bracket 70 mounted to the sidewall outboard surface 63. As shown in FIG. 1, an extendable actuator, such as hydraulic ram 72 couples the cradle assembly 30 to the tug chassis 12. When the actuator 72 is retracted, the front edge 38 is at a lower position for loading and unloading, and when the actuator 72 extended the front edge 38 is in a raised or transport position (see FIG. 6).

Referring again to FIG. 2, the cradle assembly 30 also includes adjustable nosewheel receiving means 80 for accommodating varying sized aircraft nosewheels. In the illustrated embodiment, the nosewheel receiving means 80 includes a pair of lateral arms 82, 84 adjustably mountable to the cradle member upper surface 36 to be substantially mutually parallel to one another and to longitudinal axis 50. The cradle member sidewalls 56, 58 each have a guide shaft receiving hole 86 therethrough for receiving a lateral arm guide shaft 88. A guide shaft securing collar 90 is mounted to the cradle member upper surface 36, with collar 90 concentric with holes 86 to receive shaft 88 therethrough. A set screw 92 extends through a hole in collar 90 to secure the guide shaft 88 in a desired axial position. In this manner, the guide shaft 88 is substantially parallel to the transverse axis 48.

Each of the lateral arms 82, 84 has a guide shaft receiving hole, such as hole 94, therethrough for slidably receiving the guide shaft 88. In the preferred embodiment, the arms 82 and 84 each includes a bearing assembly concentric with and mounted within hole 94. The bearing assembly includes a bearing housing 96 mounted within hole 94 and extends beyond the inboard sides of the lateral arms, such as inboard side 98 of arm 82. A bearing 100 is seated within the bearing housing 96 and secured therein by a bearing seal 102. This design advantageously allows the lateral arms 82 and 84 to slide along the guide shaft 88 even if a thin coating of rust or grit has accumulated along the surface of shaft 88 during use.

To accommodate nosewheels having varying widths, the lateral arms 82 and 84 slide along the guide shaft 88 in the direction of the transverse axis 48. To secure the lateral arms 82, 84 in a given position relative to the cradle member 32, the lower wall 34 has a plurality of lateral arm positioning holes therethrough. In the illustrated embodiment, the wall 34 has a first set 104 and a second set 106 of lateral arms positioning holes, located forwardly of sidewalls 56, 58, with each set comprising four holes (also see FIG. 1). To position the lateral arms 82, 84 relative to the cradle member upper surface 36, each arm has a positioning pin 108 slidably attached to the arm outboard surface, such as outboard surface 110 of arm 84. The positioning pin 108 includes an elevating knob 112 for raising and lowering the pin 108 relative to the lateral arm. The positioning pins 108 are located on lateral arms 82 and 84 to engage the holes of sets 104 and 106.

To prevent the lateral arms 82 and 84 from undesirably rotating about the arm guide shaft 88, one or both of the lateral arms may include an anti-rotation device. In the illustrated embodiment, the anti-rotation device comprises a nut 114 mounted to the arm along the arm inboard surface, such as surface 98 of arm 82. A bolt 116 and a nut 118 cooperate with nut 114 to restrict rotation of arms 82 and 84 around shaft 88.

Figure 3:
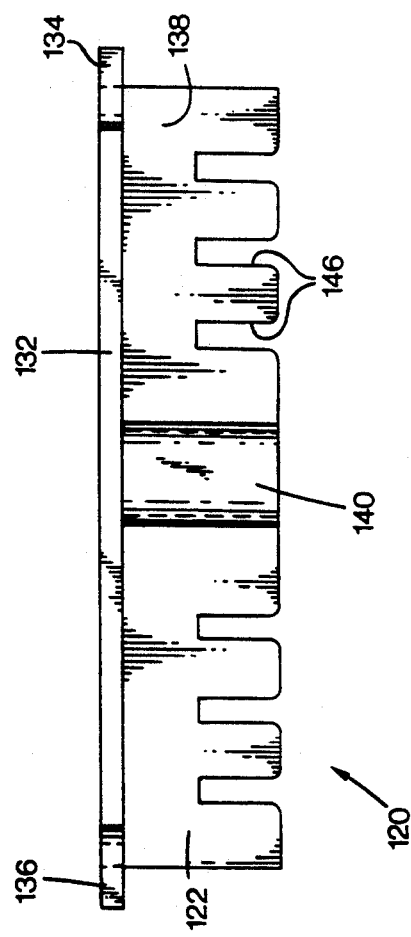
FIG. 3 is a rear elevational view of one form of a rear gate of the present invention taken along lines 3—3 of FIG. 2.

The adjustable nosewheel receiving means 80 also includes a rear gate 120 having a first wall 122 with opposing first and second edges 124, 126, and with opposing side edges 128, 130. In the illustrated embodiment, the rear gate 120 includes a second wall 132 joined to the first wall 122 along edge 126, with the first and second walls 122, 128 being substantially perpendicular. The second wall 132 includes a pair of fingers 134, 136 extending outwardly beyond the first wall side edges 128 and 130, respectively. Referring to FIG. 3, the first wall 122 has a rear surface 138 to which a stub shaft receiving tube 140 is attached. The stub shaft receiving tube 140 is sized and located to receive stub shaft 46, as shown in dashed lines in FIG. 4.

Referring again to FIG. 2, each of the lateral arms 82, 84 has an upper edge 142 and plural rear gate receiving means illustrated as a plurality of slots 144 extending downwardly from upper edge 142. The rear gate 120 has a plurality of lateral arm interengaging means illustrated as a plurality of slots 146 extending into the first wall 122 from edge 124. The slots 146 are located along first edge 124 to engage the lateral arms 82 and 84 when the positioning pins 108 are located in the three most inboard holes of lateral arm positioning hole sets 104 and 106.

Figure 5:
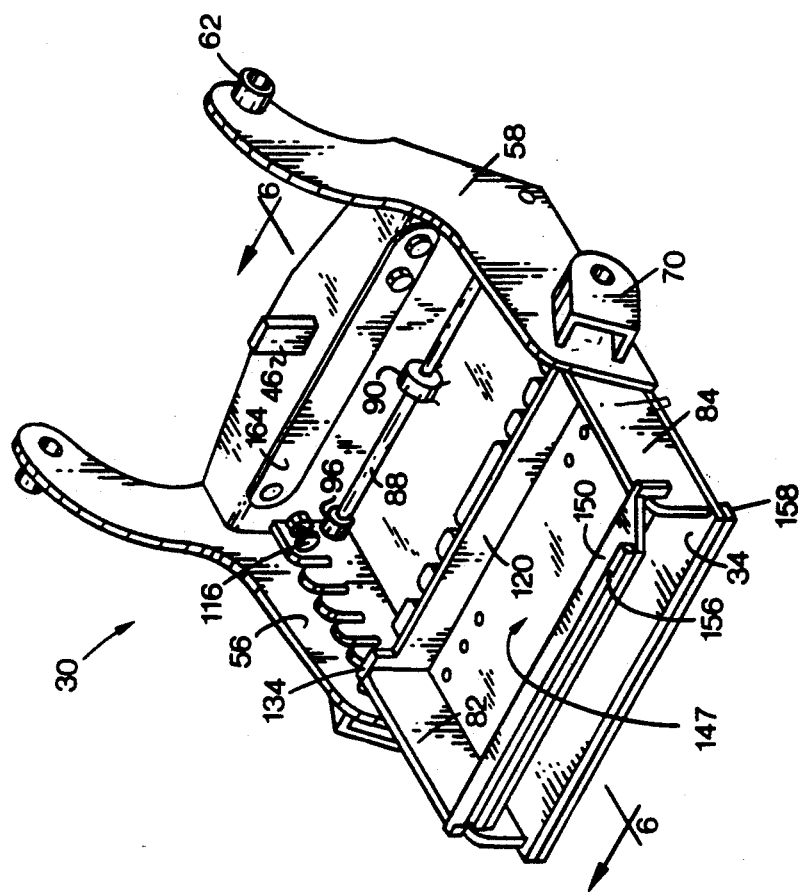
FIG. 5 is an assembled perspective view of the cradle assembly of FIG. 2 showing another manner of adjustment.
Figure 4:
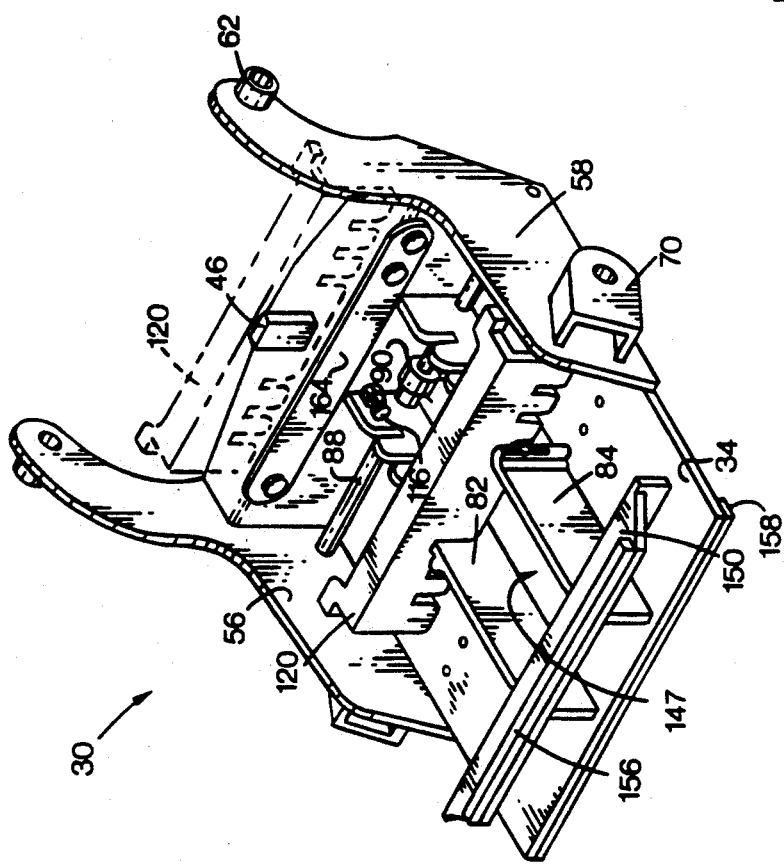
FIG. 4 is an assembled perspective view of the cradle assembly of FIG. 2 showing one manner of adjustment.

FIGS. 4 and 5 show varying interengagement positions for the lateral arms 82, 84 and rear gate 120. The lateral arms 82 and 84 cooperate with the rear gate 120 to define therebetween an aircraft nosewheel receiving corral 147 on the cradle member upper surface 36. As shown by the various configurations in FIGS. 4 and 5, the corral size is adjustable to accommodate varying sized aircraft nosewheels. For example, in FIG. 4, the lateral arms 82 and 84 are adjusted to their narrowest position, with pins 108 engaging the inboard-most holes of sets 104 and 106, and the rear gate 120 engaging the forward-most of the slots 144. For larger diameter aircraft nosewheels, the rear gate 120 may be mounted on stub shaft 46 as shown in dashed lines in FIG. 4.

Figure 6:
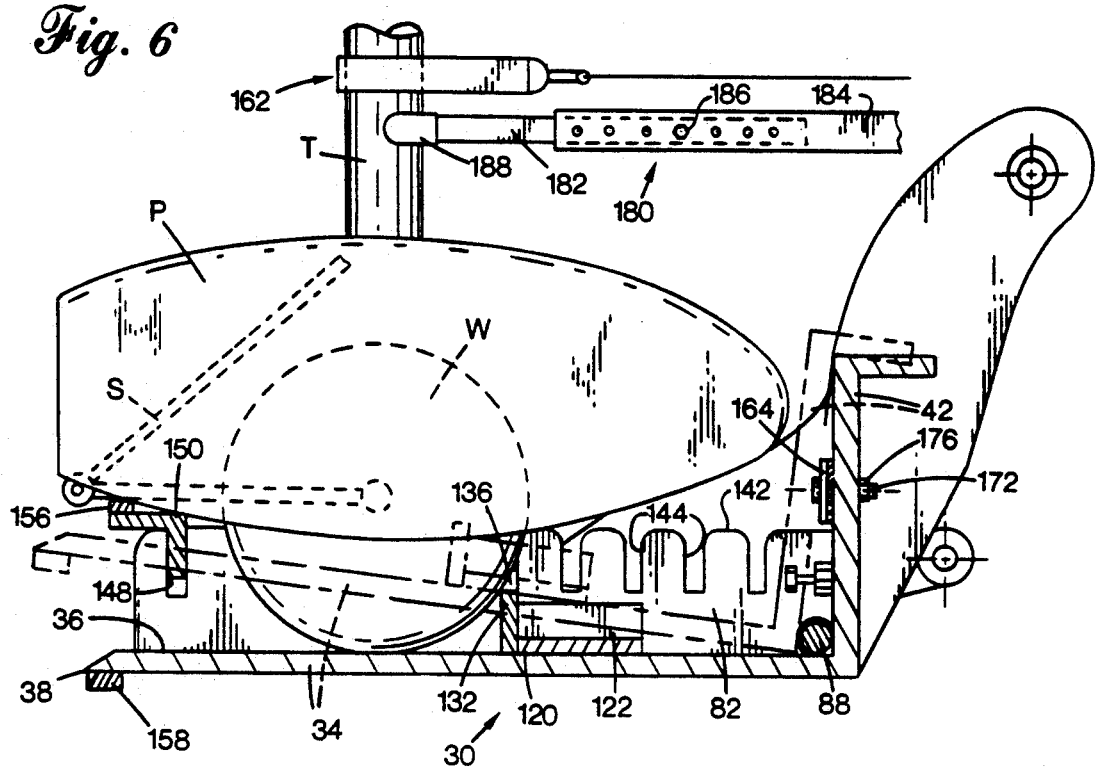
FIG. 6 is a sectional elevational view of the cradle assembly taken along lines 6—6 of FIG. 5, but shown supporting an aircraft nosewheel having a wheel skirt or wheel pant, and showing one form of a portion of a strut retaining arm assembly of the present invention.

In FIG. 5 the lateral arms 82, 84 are adjusted with pins 108 engaging the outer-most holes of hole sets 104 and 106. The rear gate 120 is positioned between the arms 82 and 84 with the first wall 122 substantially adjacent the cradle member upper surface 36, and with the side edges 128, 130 adjacent the inboard surface of the lateral arms. The rear gate fingers 134 and 136 each engage a slot 144 in one of the arms 82, 84. As shown in FIG. 6, the lower profile provided by the rear gate second wall 132 allows a wheel skirt to extend over the rear gate 120, while the nosewheel abuts the second wall 132. In the widest position of arms 82 and 84 (not shown), the pins 108 extend downwardly beyond the side edges 52 and 54, respectively, of wall 34.

FIG. 6 illustrates how an aircraft is loaded on the cradle assembly 30; with the nosewheel designated W, the wheel skirt or pants designated P, and a strut T extending upwardly from the nosewheel W to the aircraft fuselage. For the purpose of illustration, a scissors assembly S is shown which normally extends from the axle of a nosewheel W upward to an upper attachment point (not shown) on the strut T. Typically, the scissors assembly S is disconnected as shown from the upper attachment point before moving the aircraft with the tug 10.

The cradle assembly 30 is raised to a transport position (shown in dashed lines in FIG. 6) by extending rams 72. The rams 72 operate in response to an operator controlled second control lever 74 at the rear cab portion 18 of the tug 10. In the transport position, the weight of the aircraft assists in forcing the nosewheel W rearwardly into engagement with the rear gate 120. This engagement of the nosewheel W with gate 120 applies an upwardly directed torque to the arms 82, 84 which is advantageously countered by the anti-rotation assembly on each arm comprising bolt 116 and nuts 114 and 118.

As a safety feature, the lateral arms 82, 84 each have front safety gate receiving means, such as slot 148 extending downwardly from upper edge 142 and located adjacent the forward-most end of each arm. A front safety gate 150 has substantially mutually perpendicular first and second walls 152 and 154, with wall 154 received within slots 148 of arms 82, 84. The safety gate 150 enclose the nosewheel corral 147 to prevent escape of the nosewheel W, for example when transporting the aircraft uphill. However, on level surfaces, the angle of lower wall 34 when in the transport position, in combination with the aircraft forward loading (relative to the aircraft) of the nosewheel W, secures the nosewheel in the cradle assembly 30 without requiring gate 150.

To protect the scissors S when partially disconnected for ground transport, the front safety gate 150 has a cushioning strip 156, such as of UHMW plastic, attached along an upper surface of the wall 152. During ground transport, the scissors S rest against the cushioning strip 156. Similarly, to protect the finish on hangar floors, the cradle member 32 has a cradle cushion strip 158, such as of UHMW plastic, attached to a lower surface of wall 34 adjacent front edge 38.

Referring again to FIG. 1, the tug assembly 10 includes winch means, such as a winch 160 having a winch cable and strap assembly 162. As shown in FIG. 6, the strap portion of assembly 162 surrounds the aircraft strut T so the winch 160 may pull the strut T toward the chassis 12 to load the aircraft nosewheel onto the cradle assembly 30. In this embodiment, the winch 160 is electrically powered.

As another safety feature, the tug 10 has automatic winch shut-off means which disconnects power from winch 160 when the aircraft nosewheel W has reached a transport position within the cradle assembly 30. Referring to FIG. 2, for aircraft without wheel pants, the cradle assembly 30 includes a winch shut-off bumper bar 164, preferably of a spring steel. One end of the bumper bar 164 is mounted to the rear wall 42 by inboard and outboard bolts 166 and 168, respectively. A spacer 170 is mounted on bolt 166 between the bumper bar 164 and rear wall 42. A switch-actuating stud 172 is mounted to the opposite end of the bumper bar and extends through a hole 174 extending through wall 42. The stud 172 is engagable with a conventional cut-off switch 175, mounted to an undersurface of wall 44. The cut-off switch is electrically interconnected with the power supply for winch 160 to deactivate the winch when the switch is engaged by stud 172.

When a nosewheel W is loaded onto the cradle member 32 and reaches a transport position, the nosewheel engages the bumper bar 164. The bar 164 then flexes to force stud 172 further through hole 174 to engage the cut-off switch 175 and shut off or deactivate the winch 160. Thus, the winch 160 is shut off so as not to damage the aircraft or break the winch strap and cable assembly 162. Shut-off switch activation adjustment is provided by an adjustment nut 176 for stud 172 and a locking nut assembly 178 for bolt 168 to vary the travel required to activate the cut-off switch 175.

Figure 7:
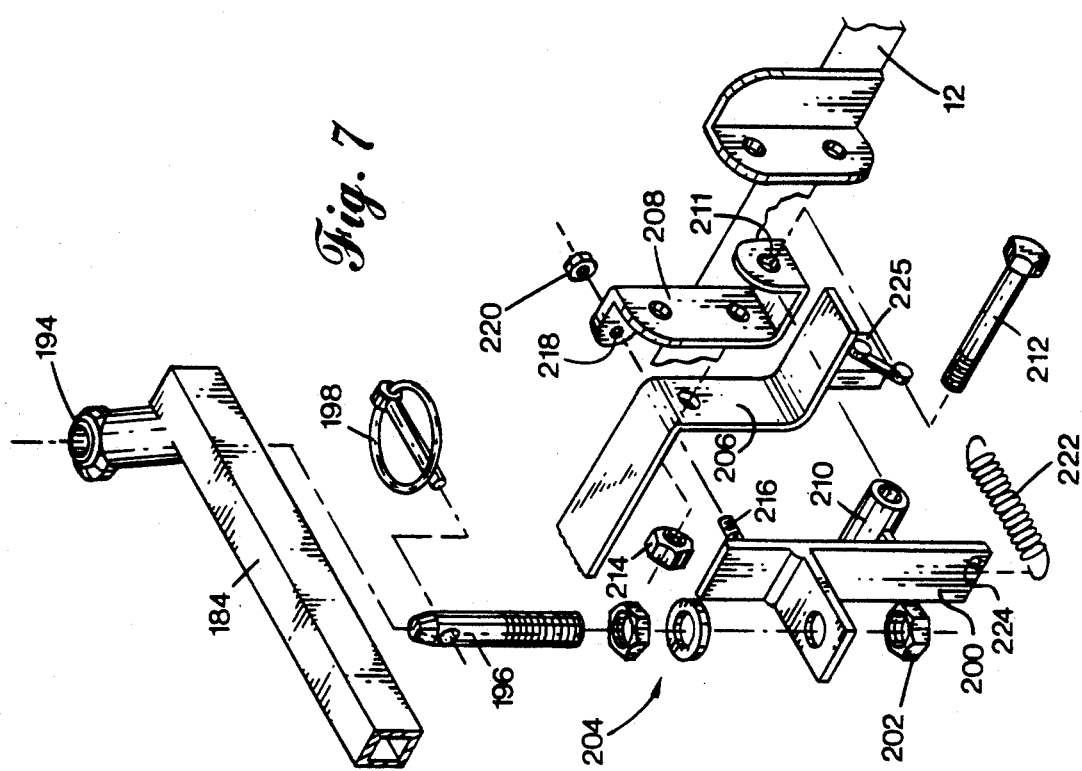
FIG. 7 is an enlarged exploded perspective view of one manner of attaching the strut retaining arm assembly of FIG. 6 to the aircraft tug chassis.

For aircraft having wheel pants P as shown in FIG. 6, it is undesirable for the wheel pants to be scratched or otherwise damaged by hitting the bumper bar. Therefore, an alternate automatic winch shut-off means is illustrated in FIGS. 6 and 7 as including a strut retaining arm assembly 180. The assembly 180 includes inner and outer slidably engaged tube members 182, 184 which may be adjusted to vary the overall length of the assembly 180. A variety of different devices may be used to secure the tube members 182 and 184 relative to one another, such as a bolt assembly 186 extending through both tube members. The inner tube member 182 terminates in a padded strut receiving cup 188, universally sized to receive a variety of strut sizes. Padding (not shown) is provided along the inner surface of cup 188 to protect the strut T from damage.

The strut retaining arm assembly 180 may be attached to the front portion 16 of the chassis 12 at any convenient location, for example adjacent or near winch cable support roller assembly 190 which includes an upright support 192 (see FIG. 1, where for clarity, the strut retaining arm assembly 180 has been omitted). As shown in FIG. 7, the outer tube member 184 has a ball joint 194 at one end. The ball joint 194 is secured to an upright support pin 196 with a conventional ring pin 198. The upright support pin is attached to a toggle bracket 200 with nut 202 and the nut and washer assembly 204. Mounting brackets 206, 208 are secured to the chassis 12 to pivotally receive a pivot tube 210 on the toggle bracket 200. A pivot pin 212 extends through a hole 211 within bracket 208, pivot tube 210, bracket 206 and is secured in place by nut 214.

The toggle bracket 200 has a stud 216 projecting rearwardly therefrom to extend through a hole 218 extending through bracket 208. The lower portion of bracket 200 adjacent a hole 224 engages a conventional switch device 225 mounted to the lower horizontal surface of bracket 206. This switch device 225 is electrically coupled to the winch power supply to shut off or deactivate the winch 160 when the switch 225 is disengaged. A nut 220 engages stud 216 to adjust the stroke length of the stud 216. A bias spring 222 is attached at one end (not shown) to chassis 12, and at the opposite end to a hole 224 through toggle bracket 200. The biasing spring 222 biases the toggle bracket into a position where the lower portion of bracket 200 normally engages the switch device 225.

Thus, when the winch assembly 160 pulls an aircraft having wheel pants P onto the cradle assembly 30, with the length of the strut retaining arm assembly properly adjusted, the strut T will contacts cup 188 when the nosewheel is in the transport position. The strut T compresses the arm assembly 180 and pushes the upper portion of toggle bracket 200 toward the chassis 12. The toggling action of bracket 200 causes the stud 216 to activate the electrical shut-off switch and turn the winch 160 off, when the nosewheel W is in the transport position. It is apparent that the strut arm retaining assembly 180 may also be adjusted to deactivate the winch at positions forward of the transport position if desired.

Figure 9:
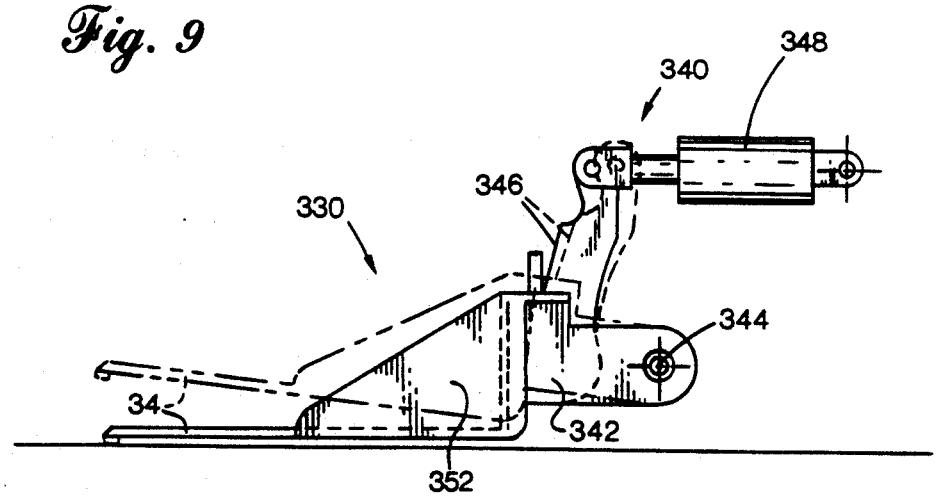
FIG. 9 is an enlarged side elevational view of the bucket assembly and the hitch actuator of FIG. 8.
Figure 8:
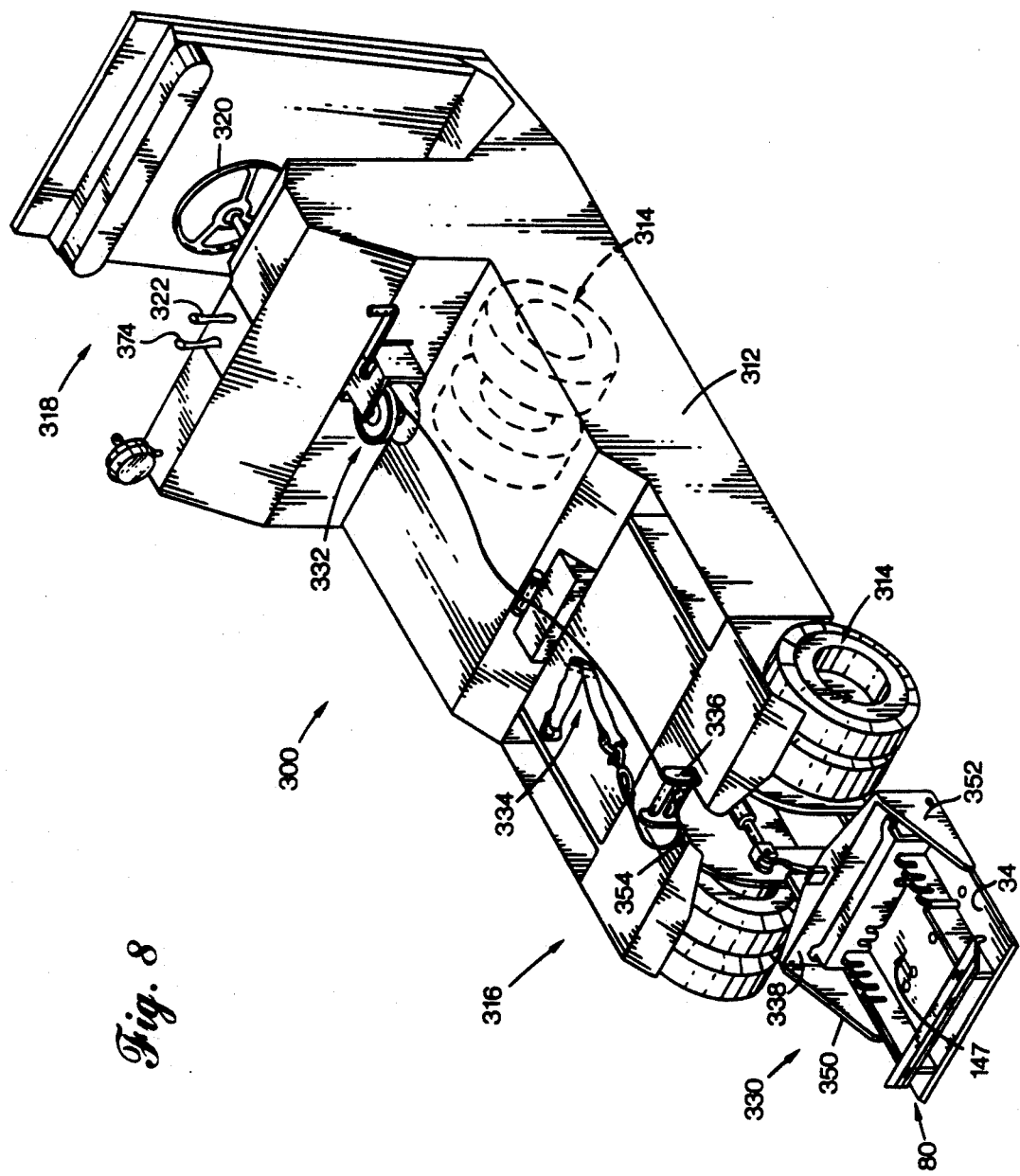
FIG. 8 is a perspective view of one form of an alternate aircraft tug of the present invention.

FIGS. 8 and 9 illustrate a second alternate embodiment of the present invention, with FIG. 8 showing an aircraft tug assembly or tug 300 constructed in accordance with the present invention. The tug 300 has a chassis 312 supported by conventional axle, wheel and tire assemblies 314. The chassis 312 has a front portion 316 and a rear cab portion 318 from where an operator may control the tug 300. In the preferred embodiment, the tug 300 is an electrical vehicle powered in a conventional manner by on-board batteries (not shown). The rear cab portion includes a steering wheel 320 and a first lever 374 for controlling the forward and rear motion of the tug and the speed at which the forward and rearward motion occurs.

An aircraft nosewheel cradle assembly 33 is attached to the front portion 316 of tug 300. The cradle assembly 330 has a cradle member 332 which is substantially similar to cradle member 32. The cradle member 332 supports the nosewheel receiving means 80, described above. The tug 300 is equipped with winch means comprising a manually operated winch 332 having a winch cable and strap assembly 334. A winch cable support roller assembly 336 is mounted to chassis 312. Therefore, the cradle assembly 330 does not require automatic winch shut-off means, such as the winch shut-off bumper bar 164 or the strut retaining arm assembly toggle bracket 200. Thus, the cradle assembly 330 has a rear upright wall 338 which varies slightly from wall 42 of cradle assembly 30.

The cradle assembly 330 is attached to the front portion 316 of tug 300 by a 3-point hitch assembly 340 (see FIG. 9). The 3-point hitch assembly 340 includes two rearwardly extending fixed pivot arms, such as arm 342 which is pivoted to the chassis with pivot pin 344. Mounted between the two fixed pivot arms and extending upwardly therefrom is ram attachment means, such as a ram attachment arm 346. A single hitch actuator, such as a hydraulic ram 348, pivots the cradle assembly 330 about the pivot point of the fixed arms, such as pivot pin 344. When the ram 348 is extended, the cradle assembly 330 is in a lowered loading and unloading position. When the ram 348 is retracted, the cradle assembly 330 is in a raised transport position, as shown in dashed lines in FIG. 9.

With the 3-point hitch assembly 340 the cradle assembly side walls are not used to mount the cradle assembly to the tug, as required by the first embodiment of FIGS. 1–7. Rather, the cradle assembly 330 has opposing triangular shaped sidewalls 350 and 352, although other shapes would also be suitable. The sidewalls 350 and 352 advantageously provide additional support between the rear wall 338 and the lower horizontal wall, which is the same as that described for wall 34 above.

The tug 300 may also include a strut retaining arm assembly 180 as shown in FIG. 6. However, since the winch 332 is manual, there is no need for the cut-off switch assembly shown in FIG. 7, and particularly no need having for toggle bracket 200 pivoted to the chassis 312. Therefore, the outer tube member 184 may be directly pivotally attached to the chassis 312 at a strut retaining arm mounting hole 354 (see FIG. 8) using ball joint 194. For example, the arm assembly 180 may be secured to hole 354 using the upright support pin 196, nut 202 and the nut and washer assembly 204 shown in FIG. 7, along with the ring pin 198.

In operation, the cradle assembly 30 or 330 is positioned in a lower loading position in front of an aircraft nosewheel W. The winch strap and cable assembly 162, 334 is wrapped around the aircraft strut T. The winch 160, 332 pulls the nosewheel W onto the cradle assembly 30, 330. The lateral arms 82 and 84 and rear gate 120 are adjusted relative to the cradle member to accommodate the particular design nosewheel of the aircraft being moved. The front safety gate 150 may optionally be used.

A variety of advantages are realized by using the improved cradle assembly and tug assembly of the present invention. For example, a variety of adapters are no longer required to accommodate varying aircraft nosewheel configurations. Furthermore, the time required to change the nosewheel receiving means 80 of the present invention is very short, compared to that required by the previous adapters. Furthermore, additional tools are not required to adapt the nosewheel receiving means 80 to accommodate the various nosewheel designs. Thus significant labor savings are realized by use of the present invention. Fewer parts required to produce the cradle assembly 30 and 330, allowing these assemblies to be more cost effectively manufactured. Additionally, valuable airport storage space is not required to store the various adapters. Furthermore, the present unit maintains the lateral arms 82, 84 in the rear gate 120 in use with the assembly at all times, so they are not as susceptible to being lost, as are some of the less frequently used adapters required by the earlier known towing and tug devices. The tug assembly 10 having the electric winch 160 of has a variety of safety features, such as the automatic winch shut-off devices. Specifically, these devices are the bumper bar 64 for nosewheels without wheel pants, and the strut retaining assembly 180 with toggle bracket 200 for wheels having wheel pants. The present invention also protects aircraft having turn limit stops on their nose gear from damage caused by exceeding the stops by allowing the nosewheel to pivot freely within the cradle assembly.

Having illustrated and described the principles of my invention with respect to a preferred embodiment, it should be apparent to those skilled in the art that my invention may be modified in arrangement and detail without departing from such principles. For example, other means of interconnecting the lateral arms and rear gate may be used, as well as alternate means for interconnecting the lateral arms with the cradle member. Furthermore, suitable material substitutions and dimensional variations for the components of the cradle assembly and tug assembly may be implemented. I claim all such modifications falling within the scope and spirit of the following claims.

I claim:

1. An aircraft tug assembly for moving an aircraft having a nosewheel, the tug assembly comprising:
    a self-propelled chassis controllable by an operator, with the chassis having a front portion;
    a cradle assembly a pivotal attachment mechanism for pivotally attaching the cradle assembly to the chassis front portion, with the cradle assembly having a cradle member and an adjustable nosewheel receiving corral for accommodating varying sized aircraft nosewheels, the corral having a pair of lateral substantially mutually parallel arms, a mechanism for adjustably mounting the lateral arms to the cradle member to provide lateral adjustment therefor, with each lateral arm having a front gate receiving member located adjacent a front end of each arm distal from the chassis, the corral also including a front gate removably mounted to the front gate receiving members on each of the lateral arms to enclose the corral;
    an electrically powered winch secured to the chassis for pulling the aircraft nosewheel onto the cradle assembly; and
    an automatic winch shut-off mechanism responsive to a transport position of an aircraft nosewheel within the cradle assembly for deactivating the winch when the aircraft nosewheel is in the transport position.

2. An aircraft tug assembly according to claim 1 wherein the automatic winch shut-off mechanism comprises:
    the cradle assembly having an upright rear wall with a switch activating bumper bar attached thereto so as to be engaged by an aircraft nosewheel in the transport position within the cradle assembly; and
    a switch device responsive to the switch activating bumper bar, the switch device shutting off the electric power to the winch when the bumper bar is engaged by the nosewheel.

3. An aircraft tug assembly according to claim 1 wherein the automatic winch shut-off mechanism comprises:
    an adjustable strut retaining arm assembly having a switch activating device so as to be engaged by an aircraft strut supporting the nosewheel when the nosewheel is within the cradle assembly; and
    a switch device responsive to the switch activating device of the strut retaining arm assembly, the switch device shutting off the electric power to the winch when the strut retaining arm assembly is engaged by the strut.

4. An aircraft tug assembly according to claim 1 wherein each lateral arm also has plural rear gate receiving members, and the corral also includes a rear gate adjustably mounted to one of the plural rear gate receiving members on each of the lateral arms.

5. An aircraft tug assembly for moving an aircraft having a nosewheel, the tug assembly comprising:
    a self-propelled chassis controllable by an operator, with the chassis having a front portion;
    a cradle assembly, a pivotal attachment mechanism for pivotally attaching the cradle assembly to the chassis front portion, with the cradle assembly having adjustable nosewheel receiving means for accommodating varying sized aircraft nosewheels;
    an electrically powered winch secured to the chassis for pulling the aircraft nosewheel onto the cradle assembly; and
    automatic winch shut-off means responsive to a transport position of an aircraft nosewheel within the cradle assembly for deactivating the winch when the aircraft nosewheel is in the transport position, wherein the automatic winch shut-off means comprises:
    the cradle assembly having an upright rear wall with a switch activating bumper bar attached thereto so as to be engaged by an aircraft nosewheel in the transport position within the cradle assembly;
    an adjustable strut retaining arm assembly having a switch activating device so as to be engaged by an aircraft strut supporting the nosewheel when the nosewheel is within the cradle assembly;
    a first switch device responsive to the switch activating bumper bar, the switch device shutting off the electric power to the winch when the bumper bar is engaged by the nosewheel; and
    a second switch device responsive to the switch activating device of the strut retaining arm assembly, the switch device shutting off the electric power to the winch when the strut retaining arm assembly is engaged by the strut.

* * * * *